US010274051B2

(12) United States Patent
Singh

(10) Patent No.: US 10,274,051 B2
(45) Date of Patent: Apr. 30, 2019

(54) MULTI-SPEED DUAL CLUTCH TRANSMISSION

(71) Applicant: GM Global Technology Operations LLC, Detroit, MI (US)

(72) Inventor: Tejinder Singh, Commerce Township, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 343 days.

(21) Appl. No.: 15/380,208

(22) Filed: Dec. 15, 2016

(65) Prior Publication Data

US 2017/0191550 A1 Jul. 6, 2017

Related U.S. Application Data

(60) Provisional application No. 62/272,831, filed on Dec. 30, 2015.

(51) Int. Cl.
*F16H 3/08* (2006.01)
*F16H 3/00* (2006.01)
F16H 3/093 (2006.01)
F16H 3/097 (2006.01)

(52) U.S. Cl.
CPC ............ *F16H 3/006* (2013.01); *F16H 3/097* (2013.01); *F16H 2003/0931* (2013.01); *F16H 2200/0073* (2013.01)

(58) Field of Classification Search
CPC . F16H 3/093; F16H 3/006; F16H 3/10; F16H 37/043; F16H 2003/007
USPC .................... 74/330, 331, 333, 340
See application file for complete search history.

(56) References Cited

U.S. PATENT DOCUMENTS

| | | | |
|---|---|---|---|
| 6,209,407 B1 * | 4/2001 | Heinzel | F16H 3/006 74/331 |
| 7,340,973 B2 * | 3/2008 | Hiraiwa | F16D 21/04 74/330 |
| 7,987,740 B2 | 8/2011 | Ross | |
| 8,016,709 B2 | 9/2011 | Wittkopp et al. | |
| 8,016,715 B2 | 9/2011 | Wittkopp et al. | |
| 8,021,263 B2 | 9/2011 | Hart et al. | |
| 8,029,402 B2 | 10/2011 | Phillips et al. | |
| 2006/0266144 A1 * | 11/2006 | Schafer | F16H 3/006 74/340 |
| 2007/0240530 A1 * | 10/2007 | Ogami | F16H 63/18 74/330 |
| 2008/0047379 A1 * | 2/2008 | Borgerson | F16H 3/006 74/331 |
| 2008/0134818 A1 * | 6/2008 | Gitt | F16H 3/006 74/330 |
| 2008/0134820 A1 * | 6/2008 | Bjorck | F16H 3/006 74/331 |
| 2008/0202268 A1 * | 8/2008 | Carey | F16H 3/006 74/331 |

* cited by examiner

*Primary Examiner* — Ha Dinh Ho

(57) ABSTRACT

A transmission is connectable to an input member and includes an output transfer gear, first and second transmission input shaft members, first and second countershaft members, a plurality of co-planar gear sets, and a plurality of torque transmitting devices. The torque transmitting devices include a plurality of synchronizer assemblies and a dual clutch assembly. The transmission is operable to provide at least one reverse speed ratio and a plurality of forward speed ratios between the input member and the output member.

20 Claims, 4 Drawing Sheets

| | 36 | 38 | 150 | 152 | 154 | 156 | 158 | 160 |
|---|---|---|---|---|---|---|---|---|
| REV | | X | | | | X | | |
| 1ST | X | | | X | | | | |
| 2ND | | X | | | X | | | |
| 3RD | X | | X | | | | | |
| 4TH | | X | | | | | | X |
| 5TH | X | | | X | | | | |
| 6TH | | X | | | | | X | |
| 7TH | X | | X | | | | | |
| 8TH | | X | | | | | | X |
| 9TH | X | | | | | X | | |
| 10TH | | X | | | | | X | |
| 11TH | X | | | | X | | | |

MULTI-SPEED DUAL CLUTCH TRANSMISSION

CROSS REFERENCE TO RELATED APPLICATIONS

This application claims the benefit of U.S. Provisional Application No. 62/272,831, filed on Dec. 30, 2015, the entire contents of which are incorporated herein by reference.

INTRODUCTION

The statements in this section merely provide background information related to the present disclosure and may or may not constitute prior art.

The present disclosure relates to transmissions and more particularly to a compact, dual clutch multiple speed transmission having countershafts to establish a plurality of forward gear speeds and at least one reverse gear speed.

A typical multiple speed transmission having countershafts and co-planar gear sets uses countershaft gears with a different, dedicated gear pair or set to achieve each forward speed ratio. Accordingly, the total number of gears required in this typical design is two times the number of forward speeds, plus three for reverse. This necessitates a large number of required gear pairs, especially in transmissions that have a relatively large number of forward speed ratios.

While current transmissions achieve their intended purpose, the need for new and improved transmission configurations which exhibit improved performance, especially from the standpoints of efficiency, responsiveness and smoothness and improved packaging, primarily reduced size and weight, is essentially constant. Accordingly, there is a need in the art for a transmission having improved packaging while providing desirable gear ratios and torque ranges.

SUMMARY

In one aspect of the present disclosure, a transmission includes a transmission housing, and a dual clutch assembly having a clutch housing connectable to a flywheel of an engine. The clutch housing is rotationally supported within the transmission housing. The transmission further includes a first, a second, a third, and a fourth gear set. The first gear set includes a first gear, a second gear, a third gear, and a fourth gear. The first gear is in mesh with the second gear and the second gear is in mesh with the third gear, and the third gear is in mesh with the fourth gear. The second gear set includes a first gear in mesh with a second gear and a third gear, the third gear set includes a first gear in mesh with a second gear and the second gear in mesh with a third gear, and the fourth gear set includes a first gear in mesh with a second gear and a third gear. The transmission further includes a first transmission input member rotatably supported in the transmission housing, and a second transmission input member rotatably supported in the transmission housing. The transmission further includes a first countershaft rotatably supported within the transmission housing and spaced apart from and parallel with the first and second transmission input members. The fourth gear of the first gear set is selectively connectable for common rotation with the first countershaft, and the second gears of the second gear set, the third gear set, and the fourth gear set are each selectively connectable for common rotation with the first countershaft. The transmission further includes a second countershaft rotatably supported within the transmission housing and spaced apart from and parallel with the first and second transmission input members. The second gear of the first gear set is selectively connectable for common rotation with the second countershaft, and the third gears of the second gear set, third gear set, and fourth gear set are each selectively connectable for common rotation with the second countershaft. The transmission further includes a first transfer gear rotatably and directly fixed for permanent, common rotation to the first countershaft, and a second transfer gear rotatably and directly fixed for permanent, common rotation to the second countershaft. The transmission further includes an output member in mesh with both the first transfer gear and the second transfer gear, and at least four synchronizer assemblies for selectively coupling at least one of the gears of the first, second, third, and fourth gear sets with at least one of the first countershaft and the second countershaft. The selective engagement of the dual clutch assembly interconnects the dual clutch housing with at least one of the first and the second transmission input members and the selective engagement of at least one of the four synchronizer assemblies establishes one of seven forward speed ratios and one reverse speed ratio.

In another aspect of the present disclosure each of the first gears of the first, and second gear sets are rotatably and directly fixed for permanent, common rotation with the first transmission input member and wherein the first gears of the third and fourth gear sets are rotatably and directly fixed for permanent, common rotation with the second transmission input member.

In yet another aspect of the present disclosure a first of the four double synchronizer assemblies selectively connects the fourth gear of the first gear set and the second gear of the second gear set to the first countershaft.

In yet another aspect of the present disclosure a second of the at least four synchronizer assemblies is a double sided synchronizer assembly that selectively connects the second gear of the first gear set and the third gear of the second gear set to the second countershaft.

In yet another aspect of the present disclosure a third of the at least four synchronizer assemblies is a double sided synchronizer assembly that selectively connects the third gear of the third gear set and the third gear of the fourth gear set to the second countershaft.

In yet another aspect of the present disclosure a fourth of the at least four synchronizer assemblies is a double sided synchronizer assembly that selectively connects the second gear of the third gear set and the second gear of the fourth gear set to the first countershaft.

In yet another aspect of the present disclosure the transmission further includes a fifth gear set and at least five synchronizer assemblies. The fifth gear set includes a first gear in mesh with a second gear. The first gear is rotatably and directly fixed for permanent, common rotation with the second transmission input member. A first of the at least five synchronizer assemblies is a double sided synchronizer assembly that selectively connects the fourth gear of the first gear set and the second gear of the second gear set to the first countershaft. A second of the at least five synchronizer assemblies is a double sided synchronizer assembly that selectively connects the second gear of the first gear set and the third gear of the second gear set to the second countershaft. A third of the at least five synchronizer assemblies is a double sided synchronizer assembly that selectively connects the third gears of the third and fourth gear sets with the second countershaft. A fourth of the at least five synchronizer assemblies is a double sided synchronizer assembly that assemblies selectively connects the second gears of the third and fourth gear sets to the first countershaft. A fifth of the at least five synchronizer assemblies is a single sided synchronizer assembly that selectively connects the second gear of the fifth gear set to the second countershaft. The fifth gear set is adjacent the dual clutch assembly, the fourth gear set is adjacent the fifth gear set, the third gear set is adjacent the fourth gear set, the second gear set is adjacent the third gear set and the first gear set is adjacent the second gear set.

In yet another aspect of the present disclosure the transmission of claim further includes a fifth and a sixth gear set, and at least six synchronizer assemblies. The fifth gear set includes a first gear in mesh with a second gear, and the first gear is rotatably and directly fixed for permanent, common rotation with the second transmission input member. The sixth gear set includes a first gear in mesh with a second gear and the first gear is rotatably and directly fixed for permanent, common rotation with the first transmission input member. A first of the at least six synchronizer assemblies is a double sided synchronizer assembly that selectively connects the fourth gear of the first gear set and the second gear of the second gear set to the first countershaft. A second of the at least six synchronizer assemblies is a double sided synchronizer assembly that selectively connects the second gear of the first gear set and the third gear of the second gear set to the second countershaft. A third of the at least six synchronizer assemblies is a double sided synchronizer assembly that selectively connects the second gear of the sixth gear set and the third gear of the fourth gear set to the second countershaft. A fourth of the at least six synchronizer assemblies is a double sided synchronizer assembly that selectively connects the third gear of the fourth gear set and the second gear of the fifth gear set with the second countershaft. A fifth of the at least six synchronizer assemblies is a single sided synchronizer assembly that selectively connects the second gear of the third gear set to the first countershaft. A sixth of the six synchronizer assemblies is a single sided synchronizer assembly that selectively connects the second gear of the fourth gear set to the first countershaft. The fifth gear set is adjacent the dual clutch assembly, the fourth gear set is adjacent the fifth gear set, the third gear set is adjacent the fourth gear set, the sixth gear set is adjacent the third gear set, the second gear set is adjacent the sixth gear set and the first gear set is adjacent the second gear set.

In yet another aspect of the present disclosure the second transmission input member is concentric with the first transmission input member and at least partially surrounds the first transmission input member.

In yet another aspect of the present disclosure the first gear set provides a first forward speed ratio and a third forward speed ratio, the second gear set provides a fifth forward speed ratio and a seventh forward speed ratio, the third gear set provides a fourth forward speed ratio and a sixth forward speed ratio, the fourth gear set provides a second forward speed ratio and a reverse speed ratio.

In yet another aspect of the present disclosure the fourth gear set is adjacent the dual dutch assembly, the third gear set is adjacent the fourth gear set, the second gear set is adjacent the third gear set, and the first gear set is adjacent the second gear set.

In yet another aspect of the present disclosure a transmission includes a transmission housing, and a dual dutch assembly having a dutch housing connectable to a flywheel of an engine. The clutch housing is rotationally supported within the transmission housing. The transmission further includes a first, a second, a third, and a fourth gear set. The first gear set includes a first gear, a second gear, a third gear, and a fourth gear. The first gear is in mesh with the second gear and the second gear is in mesh with the third gear, and the third gear is in mesh with the fourth gear. The second gear set includes a first gear in mesh with a second gear and a third gear. The third gear set includes a first gear in mesh with a second gear and a third gear, and the fourth gear set includes a first gear in mesh with a second gear and the second gear in mesh with a third gear. The transmission further includes a first transmission input member rotatably supported in the transmission housing. The first gears of the first and second gear sets are rotatably and directly fixed for permanent, common rotation with the first transmission input member. A second transmission input member rotatably supported in the transmission housing. The first gears of the third and fourth gear sets are rotatably and directly fixed for permanent, common rotation with the second transmission input member and the second transmission input member is concentric with the first transmission input member and at least partially surrounds the first transmission input member. The transmission further includes a first countershaft rotatably supported within the transmission housing and spaced apart from and parallel with the first and second transmission input members. The fourth gear of the first gear set is selectively connectable for common rotation with the first countershaft, and the second gears of the second gear set, third gear set, and fourth gear set are each selectively connectable for common rotation with the first countershaft. The transmission further includes a second countershaft rotatably supported within the transmission housing and spaced apart from and parallel with the first and second transmission input members. The second gear of the first gear set is selectively connectable for common rotation with the second countershaft, and the third gears of the second gear set, third gear set, and fourth gear set are each selectively connectable for common rotation with the second countershaft. The transmission further includes a first transfer gear rotatably and directly fixed for permanent, common rotation to the first countershaft. The transmission further includes a second transfer gear rotatably and directly fixed for permanent, common rotation to the second countershaft. The transmission further includes an output member in mesh with both the first transfer gear and the second transfer gear; and at least a first, a second, a third, and a fourth synchronizer assembly. The first synchronizer assembly is a double sided synchronizer assembly selectively that connects the fourth gear of the first gear set and the second gear of the second gear set to the first countershaft, the second synchronizer assembly is a double sided assembly that selectively connects the second gear of the first gear set and the third gear of the second gear set to the second countershaft. The third synchronizer assembly is a double sided assembly that selectively connects the third gear of the third gear set and the third gear of the fourth gear set to the second countershaft. The fourth synchronizer assembly is a double sided assembly that selectively connects the second gear of the third gear set and the second gear of the fourth gear set to the first countershaft. The selective engagement of the dual dutch assembly interconnects the dual dutch housing with at least one of the first and the second transmission input members and the selective engagement of at least one of the at least four synchronizer assemblies establishes one of seven forward speed ratios and one reverse speed ratio.

In yet another aspect of the present disclosure the second transmission input member is concentric with the first transmission input member and at least partially surrounds the first transmission input member.

In yet another aspect of the present disclosure the first gear set provides a first forward speed ratio and a third forward speed ratio, the second gear set provides a fifth forward speed ratio and a seventh forward speed ratio, the third gear set provides a fourth forward speed ratio and an sixth forward speed ratio, the fourth gear set provides a second forward speed ratio and a reverse speed ratio.

In yet another aspect of the present disclosure the fourth gear set is adjacent the dual dutch assembly, the third gear set is adjacent the fourth gear set, the second gear set is adjacent the third gear set, and the first gear set is adjacent the second gear set.

In yet another aspect of the present disclosure a transmission includes a transmission housing, and a dual dutch assembly having a dutch housing connectable to a flywheel of an engine. The dutch housing is rotationally supported within the transmission housing. The transmission further includes a first, a second, a third, a fourth, and a fifth gear set. The first gear set includes a first gear, a second gear, a third gear, and a fourth gear. The first gear is in mesh with the second gear, the second gear is in mesh with the third gear, and the third gear is in mesh with the fourth gear. The second gear set includes a first gear in mesh with a second gear and a third gear. The third gear set includes a first gear in mesh with a second gear. The fourth gear set includes a third gear in mesh with a fourth gear. The fifth gear set includes a first gear in mesh with a second gear and a third gear. A first transmission input member is rotatably supported in the transmission housing, and the first gears of the first and second gear sets are rotatably and directly fixed for permanent, common rotation with the first transmission input member. A second transmission input member is rotatably supported in the transmission housing, and the first gears of the third, fourth, and fifth gear sets are rotatably and directly fixed for permanent, common rotation with the second transmission input member. The transmission further includes a first countershaft rotatably supported within the transmission housing and spaced apart from and parallel with the first and second transmission input members. The fourth gear of the first gear set is selectively connectable for common rotation with the first countershaft, and the second gears of the second, third, and fifth gear sets are each selectively connectable for common rotation with the first countershaft. The transmission further includes a second countershaft rotatably supported within the transmission housing and spaced apart from and parallel with the first and second transmission input members. The second gear of the first and fourth gear sets, and the third gears of the second and fifth gear sets are each selectively connectable for common rotation with the second countershaft. A first transfer gear is rotatably and directly fixed for permanent, common rotation to the first countershaft. A second transfer gear is rotatably and directly fixed for permanent, common rotation to the second countershaft. An output member is in mesh with both the first transfer gear and the second transfer gear. The transmission further includes at least four synchronizer assemblies for selectively coupling at least one of the gears of the first, second, third, fourth, and fifth gear sets with at least one of the first countershaft and the second countershaft. The selective engagement of the dual clutch assembly interconnects the dual clutch housing with at least one of the first and the second transmission input members and the selective engagement of at least one of the at least four synchronizer assemblies establishes one of seven forward speed ratios and one reverse speed ratio.

In yet another aspect of the present disclosure a first of the at least four synchronizer assemblies is a double sided synchronizer assembly that selectively connects the fourth gear of the first gear set and the second gear of the second gear set to the first countershaft, a second of the at least four synchronizer assemblies is a double sided synchronizer assembly that selectively connects the second gear of the first gear set and the third gear of the second gear set to the second countershaft, a third of the at least four synchronizer assemblies is a double sided synchronizer assembly that selectively connects the second gear of the fourth gear set and the third gear of the fifth gear set to the second countershaft, and a fourth of the at least four synchronizer assemblies is a double sided synchronizer assembly that selectively connects the second gear of the third gear set and the second gear of the fifth gear set to the first countershaft.

In yet another aspect of the present disclosure the second transmission input member is concentric with the first transmission input member and at least partially surrounds the first transmission input member.

In yet another aspect of the present disclosure the first gear set provides a first forward speed ratio and a third forward speed ratio, the second gear set provides a fifth forward speed ratio and a seventh forward speed ratio, the third gear set provides a sixth forward speed ratio, the fourth gear set provides a fourth forward speed ratio, the fifth gear set provides a second forward speed ratio and a reverse speed ratio.

In yet another aspect of the present disclosure the fifth gear set is adjacent the dual clutch assembly, the fourth gear set is adjacent the fifth gear set, the third gear set is adjacent the fourth gear set, the second gear set is adjacent the third gear set, and the first gear set is adjacent the second gear set.

Further areas of applicability will become apparent from the description provided herein. It should be understood that the description and specific examples are intended for purposes of illustration only and are not intended to limit the scope of the present disclosure.

DETAILED DESCRIPTION

Figures 1, 2:
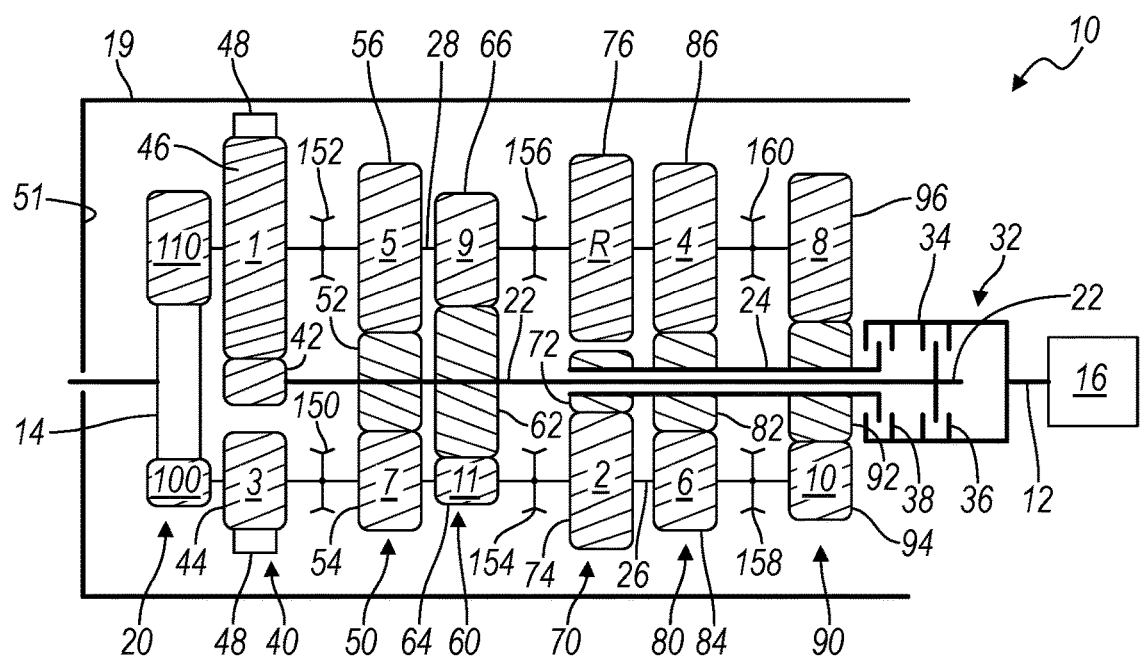
FIG. 1 is a schematic view of an embodiment of an eleven speed transmission having a dual clutch, two transmission input shafts, two countershafts, a plurality of gear sets and a plurality of synchronizers, according to an exemplary embodiment.
FIG. 2 is a clutch table illustrating the state of engagement of the dual clutch and each of the plurality of synchronizers for each of the eleven forward gear ratios and one reverse gear ratio, according to an exemplary embodiment.

Referring to FIG. 1, a multiple speed transmission is generally indicated by reference number 10. The transmission 10 is connectable to an input member 12 and has an output member or gear 14. In the present embodiment, the input member 12 is a shaft and the output member 14 is a gear, however those skilled in the art will appreciate that the input member 12 may be components other than shafts and the output member 14 may be a component, such as a shaft or chain/sprocket combination, other than a gear.

The input member 12 is continuously connected with an engine 16 or other torque producing machine to provide a driving torque to input member 12. The output member or gear 14 rotatably drives a differential assembly 15 (not shown). The differential assembly 15 transfers torque delivered by output member 14, ultimately, to road wheels (not shown).

The transmission 10 includes a housing 19 that at least partially encloses a gearing arrangement 20. The gearing arrangement 20 includes various shafts or members, co-planar intermeshing gear sets, a dual clutch assembly, and selectively engageable synchronizers, as will be described herein. For example, the gearing arrangement 20 includes a first transmission input shaft or member 22, a second transmission input shaft or member 24, a first countershaft 26 and a second countershaft 28. The second transmission input shaft or member 24 is a hollow shaft that is concentric with and at least partially overlies the first transmission input shaft or member 22. The first countershaft 26 and the second countershaft 28 are each spaced apart from and parallel with the first and second transmission input shaft members 22, 24. The first and second transmission input shafts 22, 24 define a first axis of rotation, the first countershaft 26 defines a second axis of rotation and the second countershaft 28 defines a third axis of rotation. The position and location of countershafts 26 and 28 relative to first and second transmission input shafts 22, 24 are interchangeable.

A dual clutch assembly 32 is connectable between the input member 12 and the first and second transmission input shaft members 22, 24. The dual clutch assembly 32 includes a clutch housing 34 connectable for common rotation with the input member 12. Further, the dual clutch assembly 32 has first and second clutch elements or hubs 36 and 38. Clutch elements 36 and 38 together with the clutch housing 34 are configured to form a friction clutch, as is known in the art as a dual clutch. More specifically, clutch elements 36, 38 and the clutch housing 34 have friction plates mounted thereon or otherwise coupled thereto that interact to form a friction clutch. The clutch element 36 is selectively connectable for common rotation with the first transmission input shaft or member 22 and the clutch element 38 is selectively connectable for common rotation with the second transmission input shaft or member 24. Thus, selective engagement of clutch element 36 with the clutch housing 34 connects the input member 12 for common rotation with the first transmission input shaft member 22. Selective engagement of clutch element 38 with the clutch housing 34 connects the input member 12 for common rotation with the second transmission input shaft member 24. It should be appreciated that the dual clutch assembly 32 shown throughout the Figures may be a wet or dry clutch assembly without departing from the scope of the present invention.

The gearing arrangement 20 also includes a plurality of co-planar, meshing gear sets 40, 50, 60, 70, 80 and 90. The present invention contemplates that the plurality of co-planar, meshing gear sets 40, 50, 60, 70, 80 and 90 may be arranged axially along transmission input shafts 22, 24 in an order other than that which is shown in FIG. 1 and still be within the scope of the invention. Co-planar gear set 40 includes a first pinion gear 42, a second pinion gear 44, a third pinion gear 46 and an idler gear 48. First pinion gear 42 is rotatably fixed and connected for common rotation with the transmission input shaft 22. Second pinion gear 44 is freely rotatable about the first countershaft 26 and meshes with the idler gear 48. Third pinion gear 46 is freely rotatable about the second countershaft 28 and meshes with idler gear 48. It should be appreciated that first pinion gear 42 may be a separate gear structure fixed to the transmission input shaft 22 or gear teeth/splines formed on an outer surface of the transmission input shaft 22 without departing from the scope of the present invention. Likewise, it should also be appreciated that second pinion gear 44 may be a separate gear structure fixed to the first countershaft 26 or gear teeth/splines formed on an outer surface of the first countershaft 26 without departing from the scope of the present invention. Similarly, it should be appreciated that third pinion gear 46 may be a separate gear structure fixed to the second countershaft 28 or gear teeth/splines formed on an outer surface of the second countershaft 28 without departing from the scope of the present invention. Gear set 40 is disposed adjacent a wall 51 of the transmission housing 19 on the opposite side of the transmission relative to the dual clutch assembly 32.

Co-planar gear set 50 includes a first pinion gear 52, a second pinion gear 54 and a third pinion gear 56. First pinion gear 52 is rotatably fixed and connected for common rotation with the first transmission input shaft member 22 and meshes with the second pinion gear 54 and the third pinion gear 56. Second pinion gear 54 is freely rotatable about the first countershaft 26. Third pinion gear 56 is freely rotatable about the second countershaft 28. Gear set 50 is positioned axially adjacent gear set 40.

Co-planar gear set 60 includes a first pinion gear 62, a second pinion gear 64 and a third pinion gear 66. First pinion gear 62 is rotatably fixed and connected for common rotation with the first transmission input shaft member 22 and meshes with the second pinion gear 64 and the third pinion gear 66. Second pinion gear 64 is freely rotatable about the first countershaft 26. Third pinion gear 66 is freely rotatable about the second countershaft 28. Gear set 60 is disposed adjacent gear set 50.

Co-planar gear set 70 includes a first pinion gear 72, a second pinion gear 74 and a third pinion gear 76. First pinion gear 72 is rotatably fixed and connected for common rotation with the second transmission input shaft member 24 and meshes with the second pinion gear 74. The second pinion gear 74 is freely rotatable about the first countershaft 26. The third pinion gear 76 is freely rotatable about the second countershaft 28 and meshes with the second pinion gear 74. Gear set 70 is positioned adjacent gear set 60.

Co-planar gear set 80 includes a first pinion gear 82, a second pinion gear 84 and a third pinion gear 86. First pinion gear 82 is rotatably fixed and connected for common rotation with the second transmission input shaft member 24 and meshes with the second pinion gear 84 and with the third pinion gear 86. The second pinion gear 84 is freely rotatable about the first countershaft 26. The third pinion gear 86 is freely rotatable about the second countershaft 28. Gear set 80 is positioned adjacent gear set 70.

Co-planar gear set 90 includes a first pinion gear 92, a second pinion gear 94 and a third pinion gear 96. First pinion gear 92 is rotatably fixed and connected for common rotation with the second transmission input shaft member 24 and meshes with the second pinion gear 94 and with the third pinion gear 96. The second pinion gear 94 is freely rotatable about the first countershaft 26. The third pinion gear 96 is freely rotatable about the second countershaft 28. Gear set 90 is positioned adjacent gear set 80.

Further, a first countershaft transfer gear 100 is fixedly connected for common rotation with the first countershaft member 26. A second countershaft transfer gear 110 is fixedly connected for common rotation with the second countershaft member 28. First countershaft transfer gear 100 is configured to mesh with output member 14 and the second countershaft transfer gear 110 is configured to mesh with output member 14. However, the first countershaft transfer gear 100 and the second countershaft transfer gear 110 do not mesh with each other. In another aspect, the first countershaft transfer gear 100, second countershaft transfer gear 110 and output member 14 are sprockets that are coupled together by a chain (not shown).

A park gear (not shown) may be provided for placing transmission 10 in a park mode that prevents output member 14 from rotating. The park gear may be rotationally fixed to the first or second countershaft members 26 and 28. However, the axial location of the park gear along the first or second countershaft members 26 or 28 may be altered in accordance with available packaging space.

With continued reference to FIG. 1, the transmission 10 further includes a plurality of selectively engageable synchronizer assemblies 150, 152, 154, 156, 158 and 160. Synchronizers 150, 152, 154, 156, 158 and 160 and are double sided synchronizers and generally include a shift fork (not shown) that is bi-directionally translated by an actuator (not shown) into at least two engaged positions and a neutral or disengaged position. In the present embodiment, synchronizer 150 is selectively actuatable to selectively connect either the second pinion gear 44 or the second pinion gear 54 for common rotation with the first countershaft member 26. Synchronizer 152 is selectively actuatable to selectively connect either the third pinion gear 46 or the third pinion gear 56 for common rotation with the second countershaft member 28. Synchronizer 154 is selectively actuatable to selectively connect either the second pinion gear 64 or the second pinion gear 74 for common rotation with the first countershaft member 26. Synchronizer 156 is selectively actuatable to selectively connect either the third pinion gear 66 or the third pinion gear 76 for common rotation with the second countershaft member 28. Synchronizer 158 is selectively actuatable to selectively connect either the second pinion gear 84 or the second pinion gear 94 for common rotation with the first countershaft member 26. Synchronizer 160 is selectively actuatable to selectively connect either the third pinion gear 86 or the third pinion gear 96 for common rotation with the second countershaft member 28.

The transmission 10 is capable of transmitting torque from the input shaft 12 to the output gear member 14 in at least eleven forward torque ratios and at least one reverse torque ratio. Each of the forward torque ratios and the reverse torque ratio is attained by selective engagement of the dual clutch assembly 32 and one or more of the synchronizer assemblies 150, 152, 154, 156, 158 and 160. Those skilled in the art will readily understand that a different speed ratio is associated with each torque ratio.

It should also be appreciated that each individual gear set or combinations of gear sets 40, 50, 60, 70, 80 and 90 provides one or more forward and/or reverse gear ratios upon selective engagement of the synchronizer assemblies 150, 152, 154, 156, 158 and 160. Moreover, it should be appreciated that a particular forward or reverse speed ratio may be achieved by different combinations of synchronizer and associated gear sets without departing from the scope of the present invention.

Referring now to FIG. 2, a truth table or clutching chart illustrates the state of engagement for the dual clutch 32 and the synchronizers 150, 152, 154, 156, 158 and 160. An "X" in the box indicates that the particular clutch and/or synchronizer are engaged to achieve the desired gear state. Actual numerical gear ratios of the various gear states are not shown although it should be appreciated that the gear ratios may be adjusted over significant ranges to accommodate various applications and operational criteria of the transmission. Of course, other gear ratios are achievable depending on the gear diameter, gear teeth count and gear configuration selected.

For example, to establish the reverse torque ratio, clutch element 38 is engaged and synchronizer 156 is activated. Clutch element 38 couples the input member 12 with the second transmission input shaft member 24. Synchronizer 156 connects the third pinion 76 of gear set 70 to the second countershaft member 28. More specifically, input torque from the input shaft 12 is transferred through the dual clutch assembly 32 to the second transmission input shaft member 24, from transmission input shaft member 24 to gear 72, from gear 72 to gear 74, from gear 74 to gear 76, from gear 76 to synchronizer 156, from synchronizer 156 to second countershaft member 28, from second countershaft member 28 to second countershaft transfer gear 110 and from second countershaft transfer gear 110 to the output member 14.

To establish a first forward torque ratio (i.e. a 1st gear), clutch element 36 is engaged and synchronizer 152 activated. Clutch element 36 couples the input member 12 with the first transmission input shaft member 22. Synchronizer 152 connects the third pinion 46 of the first gear set 40 to the second countershaft member 28. More specifically, input torque from the input shaft 12 is transferred through the dual clutch assembly 32 to the first transmission input shaft member 22, from transmission input shaft member 22 to gear 42, from gear 42 to gear 46, from gear 46 to synchronizer 152, from synchronizer 152 to second countershaft member 28, from second countershaft member 28 to second countershaft transfer gear 110 and from second countershaft transfer gear 110 to the output member 14.

To establish a second forward torque ratio (i.e. a 2nd gear), clutch element 38 is engaged and synchronizer 154 is activated. Clutch element 38 couples the input member 12 with the second transmission input shaft member 24. Synchronizer 154 connects the second gear 74 of gear set 70 to the first countershaft member 26. More specifically, input torque from the input shaft 12 is transferred through the dual clutch assembly 32 to the second transmission input shaft member 24 to gear 72, from gear 72 to gear 74, from gear 74 to synchronizer 154, from synchronizer 154 to first countershaft member 26, from first countershaft member 26 to first countershaft transfer gear 100 and from first countershaft transfer gear 100 to the output member 14.

To establish a third forward torque ratio (i.e. a 3rd gear), clutch element 36 is engaged and synchronizer 150 is activated. Clutch element 36 couples the input member 12 to the first transmission input shaft member 22 which rotates pinion 42. Synchronizer 150 connects the second gear 44 of gear set 40 to the first countershaft member 26. More specifically, input torque from the input shaft 12 is transferred through the dual clutch assembly 32 to the first transmission input shaft member 22 to gear 42, from gear 42 to gear 46, from gear 46 to idler gear 48, from idler gear 48 to gear 44, from gear 44 to synchronizer 150, from synchronizer 150 to first countershaft member 26, from first countershaft member 26 to first countershaft transfer gear 100 and from first countershaft transfer gear 100 to the output member 14.

To establish a fourth forward torque ratio (i.e. a 4th gear), clutch element 38 is engaged and synchronizer 160 is activated. Clutch element 38 couples the input member 12 with the second transmission input shaft member 24. Synchronizer 160 connects the third gear 86 of gear set 80 to the second countershaft member 28. More specifically, input torque from the input shaft 12 is transferred through the dual clutch assembly 32 to the second transmission input shaft member 24 to gear 82, from gear 82 to gear 86, from gear 86 to synchronizer 160, from synchronizer 160 to second countershaft member 28, from second countershaft member 28 to second countershaft transfer gear 110 and from second countershaft transfer gear 110 to the output member 14.

To establish a fifth forward torque ratio (i.e. a 5th gear), clutch element 36 is engaged and synchronizer 152 is activated. Clutch element 36 couples the input member 12 with the first transmission input shaft member 22. Synchronizer 152 connects the third pinion 56 of the second gear set 50 to the second countershaft member 28. More specifically, input torque from the input shaft 12 is transferred through the dual clutch assembly 32 to the first transmission input shaft member 22 and to gear 52, from gear 52 to gear 56, from gear 56 to synchronizer 152, from synchronizer 152 to the second countershaft member 28, from second countershaft member 28 to the second countershaft transfer gear 110 and from second countershaft transfer gear 110 to the output member 14.

To establish a sixth forward torque ratio (i.e. a 6th gear), clutch element 38 is engaged and synchronizer 158 is activated. Clutch element 38 couples the input member 12 with the second transmission input shaft member 24. Synchronizer 158 connects second pinion gear 84 of the fifth gear set 80 to the first countershaft member 26. More specifically, input torque from the input shaft 12 is transferred through the dual clutch assembly 32 to the second transmission input shaft member 24 and to gear 82, from gear 82 to gear 84, from gear 84 to synchronizer 158, from synchronizer 158 to first countershaft member 26, from first countershaft member 26 to first countershaft transfer gear 100, from transfer gear 100 to the output member 14.

To establish a seventh forward torque ratio (i.e. a 7th gear), clutch element 36 is engaged and synchronizer 150 is activated. Clutch element 36 couples the input member 12 with the first transmission input shaft member 22. Synchronizer 150 connects second pinion gear 54 of the second gear set 50 to the first countershaft member 26. More specifically, input torque from the input shaft 12 is transferred through the dual clutch assembly 32 to the first transmission input shaft member 22 and to gear 52, from gear 52 to gear 54, from gear 54 to synchronizer 150, from synchronizer 150 to first countershaft member 26, from first countershaft member 26 to first countershaft transfer gear 100, from transfer gear 100 to the output member 14.

To establish an eighth forward torque ratio (i.e. an 8th gear), clutch element 38 is engaged and synchronizer 160 is activated. Clutch element 38 couples the input member 12 with the second transmission input shaft member 24. Synchronizer 160 connects the third gear 96 of gear set 90 to the second countershaft member 28. More specifically, input torque from the input shaft 12 is transferred through the dual clutch assembly 32 to the second transmission input shaft member 24 to gear 92, from gear 92 to gear 96, from gear 96 to synchronizer 160, from synchronizer 160 to second countershaft member 28, from second countershaft member 28 to second countershaft transfer gear 110 and from second countershaft transfer gear 110 to the output member 14.

For example, to establish the ninth torque ratio (i.e. a 9th gear), clutch element 36 is engaged and synchronizer 156 is activated. Clutch element 36 couples the input member 12 with the first transmission input shaft member 22. Synchronizer 156 connects the third pinion 66 of gear set 60 to the second countershaft member 28. More specifically, input torque from the input shaft 12 is transferred through the dual clutch assembly 32 to the first transmission input shaft member 22, from transmission input shaft member 22 to gear 62, from gear 62 to gear 66, from gear 66 to synchronizer 156, from synchronizer 156 to second countershaft member 28, from second countershaft member 28 to second countershaft transfer gear 110 and from second countershaft transfer gear 110 to the output member 14.

To establish a tenth forward torque ratio (i.e. a 10th gear), clutch element 38 is engaged and synchronizer 158 is activated. Clutch element 38 couples the input member 12 with the second transmission input shaft member 24. Synchronizer 158 connects second pinion gear 94 of the sixth gear set 90 to the first countershaft member 26. More specifically, input torque from the input shaft 12 is transferred through the dual clutch assembly 32 to the second transmission input shaft member 24 and to gear 92, from gear 92 to gear 94, from gear 94 to synchronizer 158, from synchronizer 158 to first countershaft member 26, from first countershaft member 26 to first countershaft transfer gear 100, from transfer gear 100 to the output member 14.

To establish an eleventh forward torque ratio (i.e. an 11th gear), clutch element 36 is engaged and synchronizer 154 is activated. Clutch element 36 couples the input member 12 with the first transmission input shaft member 22. Synchronizer 154 connects the second gear 64 of gear set 60 to the first countershaft member 26. More specifically, input torque from the input shaft 12 is transferred through the dual clutch assembly 32 to the first transmission input shaft member 22 to gear 62, from gear 62 to gear 64, from gear 64 to synchronizer 154, from synchronizer 154 to first countershaft member 26, from first countershaft member 26 to first countershaft transfer gear 100 and from first countershaft transfer gear 100 to the output member 14.

Again, it should be appreciated that any one of the gears of gear sets 40, 50, 60, 70, 80 and 90 may be changed in size and number gear teeth or gear pitch to produce a certain forward and reverse torque ratio without departing from the scope of the present invention.

Figure 3:
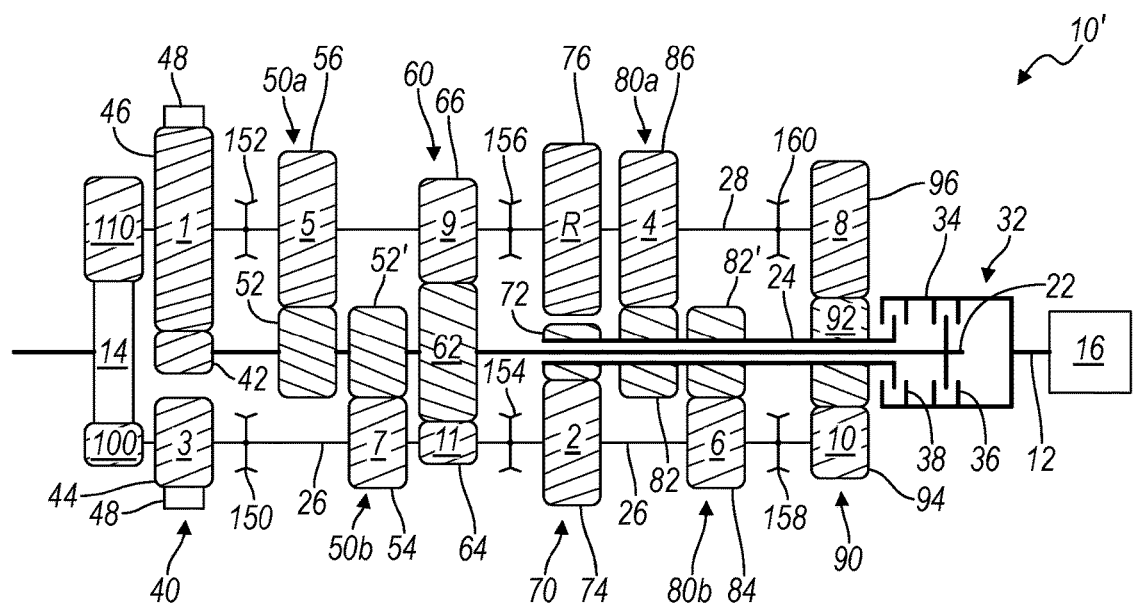
FIG. 3 is a schematic view of an alternate embodiment of an eleven speed transmission having a dual clutch, two transmission input shafts, two countershafts, a plurality of gear sets and a plurality of synchronizers according to an exemplary embodiment.

The present invention contemplates that a variety of torque ratios (i.e., the ratio of torque of the output member 14 to the input member 12) and ratio steps are achievable through the selection of tooth counts of the gears of the transmission 10. The present invention has many advantages and benefits over the prior art. For example, each of the gear sets 40, 50, 60, 70, 80 and 90 of transmission 10 may be separated into two independent gear sets as shown in FIG. 3. More specifically, gear sets 50 and 80 of transmission 10 are shown in FIG. 3 separated into two gear sets 50a and 50b and 80a and 80b to form an alternate transmission 10'. Gear set 50a includes gear 52 fixedly connected for common rotation to transmission input shaft 22. Gear set 50b includes gear 52' fixedly connected for common rotation to transmission input shaft 22. Gear set 50a further includes gear 56 that is freely rotatable about second countershaft 28 and in mesh with gear 52. Gear set 50b further includes gear 54 that is freely rotatable about first countershaft 26 and in mesh with gear 52'. Similarly, gear set 80a includes gear 82 fixedly connected for common rotation to second transmission input shaft 24. Gear set 80b includes gear 82' fixedly connected for common rotation to second transmission input shaft 24. Gear set 80a further includes gear 86 that is freely rotatable about second countershaft 28 and in mesh with gear 82. Gear set 80b further includes gear 84 that is freely rotatable about first countershaft 26 and in mesh with gear 82'. As in transmission 10, synchronizer 152 selectively connects the gear 56 of gear set 50a to second countershaft 28, synchronizer 150 selectively connects the gear 54 of gear set 50b to first countershaft 26, synchronizer 158 selectively connects the gear 84 of gear set 80b to first countershaft 26 and synchronizer 160 selectively connects the gear 86 of gear set 80a to second countershaft 28.

Figure 4:
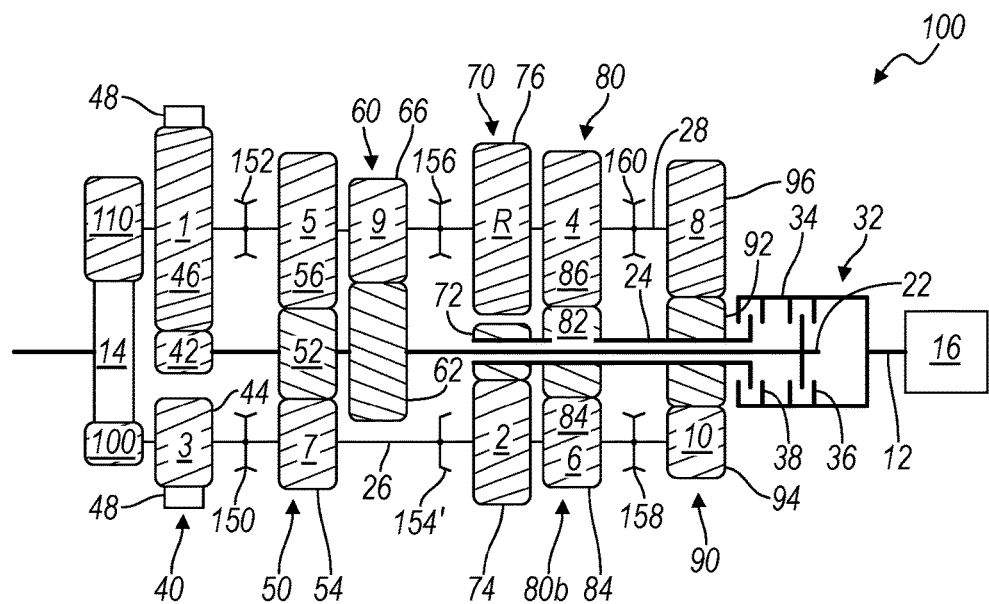
FIG. 4 is a schematic view of an embodiment of a ten speed transmission having a dual clutch, two transmission input shafts, two countershafts, a plurality of gear sets and a plurality of synchronizers, according to an exemplary embodiment.

With reference to FIG. 4, a ten speed dual clutch transmission 100 is illustrated, in accordance with the present invention. The ten speed transmission 100 has the same components as transmission 10 as described above and as indicated by like reference numbers depicting like components, as shown in FIG. 1. However, pinion gear 64 of gear set 60 of transmission 10 is not present in gear set 60 of transmission 100. Gear set 60 of transmission 100 has only two pinion gears (i.e. pinion gear 62 fixedly connected for common rotation with transmission input shaft 22 and pinion gear 66 selectively connectable to second countershaft 28). Accordingly, a maximum of ten forward speeds are attainable with the remaining pinion gears. Gear ratios 1-9 and reverse in transmission 100 are attained as described above with respect to transmission 10. Moreover, synchronizer 154 in the instant embodiment is configured as single-sided synchronizer 154' for selectively connecting pinion gear 74 for common rotation with first countershaft 26.

Figure 5:
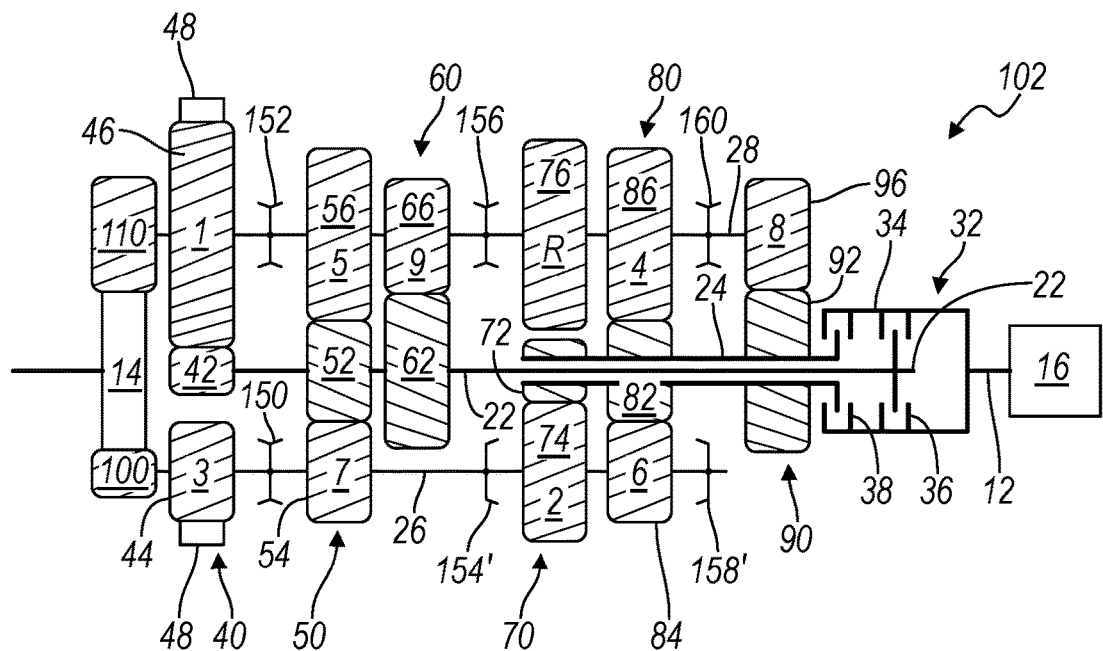
FIG. 5 is a schematic view of another embodiment of a nine speed transmission having a dual clutch, two transmission input shafts, two countershafts, a plurality of gear sets and a plurality of synchronizers, according to an exemplary embodiment.

Referring now to FIG. 5, a nine speed dual clutch transmission 102 is illustrated according to the principles of the invention. Nine speed transmission 102 has the same components as described above with respect to transmission 100 of FIG. 4 and as indicated by like reference numbers depicting like components. The nine speed transmission 102 is achieved by eliminating pinion gear 94 of gear set 90 and replacing synchronizer 158 with a single-sided synchronizer 158'. Synchronizer 158' is selectively actuatable to connect gear 84 for common rotation with first countershaft 26.

Figure 6:
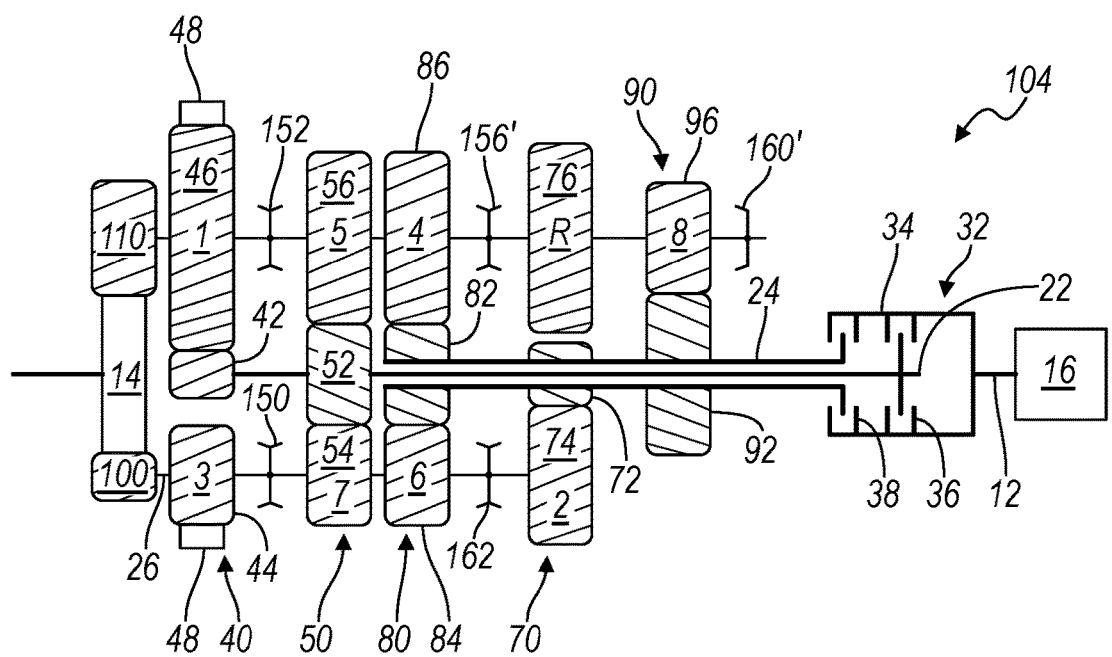
FIG. 6 is a schematic view of another embodiment of an eight speed transmission having a dual clutch, two transmission input shafts, two countershafts, a plurality of gear sets and a plurality of synchronizers, according to an exemplary embodiment.

Referring now to FIG. 6, an eight speed dual clutch transmission 104 is illustrated according to the principles of the invention. Eight speed transmission 104 has the same components as described above with respect to transmission 102 of FIG. 5 and as indicated by like reference numbers depicting like components. The eight speed transmission 104 is achieved by eliminating pinion gear set 60 and synchronizers 154' and 158'. Moreover, gear set 80 is now located adjacent gear set 50. Synchronizer 156' is selectively actuatable to connect gear 86 and gear 76 for common rotation with second countershaft 28. Synchronizer 162 is added to selectively connect gear 84 and gear 74 for common rotation with first countershaft 26. Synchronizer 160' is now a single-sided synchronizer selectively actuatable to connect gear 96 for common rotation with second countershaft 28.

Figure 7:
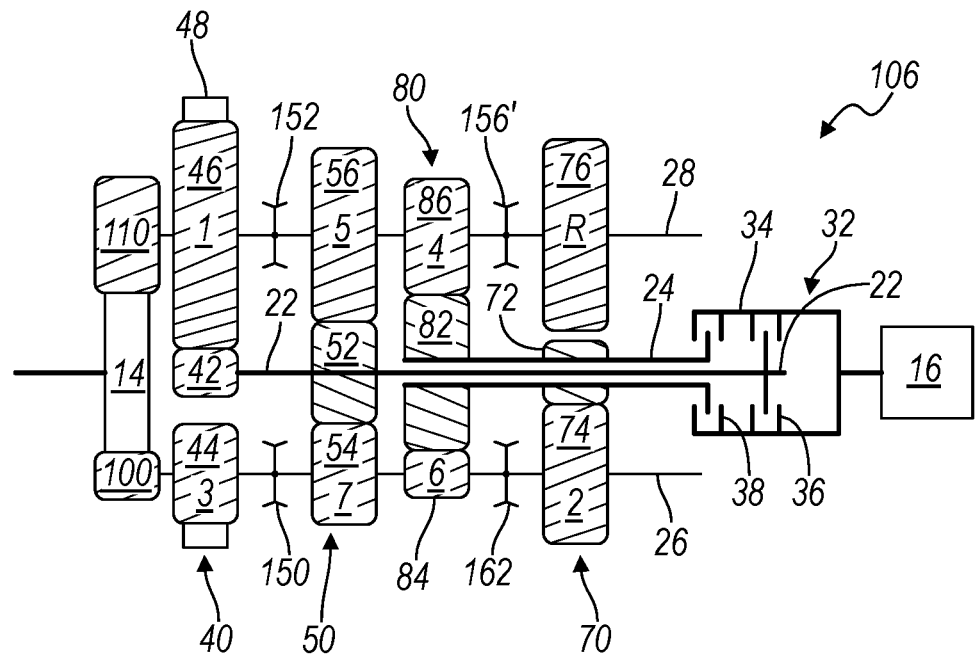
FIG. 7 is a schematic view of another embodiment of a seven speed transmission having a dual clutch, two transmission input shafts, two countershafts, a plurality of gear sets and a plurality of synchronizers, according to an exemplary embodiment.

Referring now to FIG. 7, a seven speed dual clutch transmission 106 is illustrated according to the principles of the invention. Seven speed transmission 106 has the same components as described above with respect to transmission 104 of FIG. 6 and as indicated by like reference numbers depicting like components. The seven speed transmission 106 is achieved by eliminating gear set 90 and synchronizer 160'.

Figure 8:
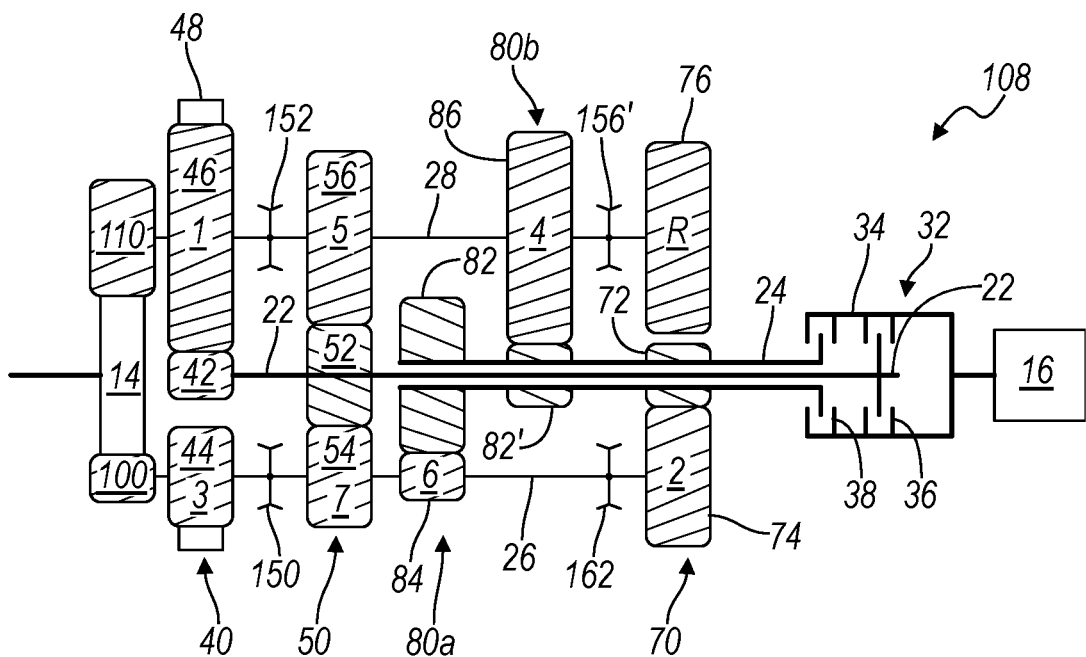
FIG. 8 is a schematic view of alternate embodiment of a seven speed transmission having a dual clutch, two transmission input shafts, two countershafts, a plurality of gear sets and a plurality of synchronizers, according to an exemplary embodiment.

Referring now to FIG. 8, an alternate arrangement for a seven speed dual clutch transmission 108 is illustrated according to the principles of the invention. Seven speed transmission 108 has the same components as described above with respect to transmission 106 of FIG. 7 and as indicated by like reference numbers depicting like components. However, gear set 80 is separated into two gear sets 80a and 80b. Gear set 80a includes gear 82 fixedly connected for common rotation to transmission input shaft 24. Gear set 80b includes gear 82' fixedly connected for common rotation to transmission input shaft 24. Gear set 80b further includes gear 86 that is freely rotatable about second countershaft 28 and in mesh with gear 82'. Gear set 80a further includes gear 84 that is freely rotatable about first countershaft 26 and in mesh with gear 82. Synchronizer 156' is selectively actuatable to connect either gear 86 or gear 76 for common rotation with second countershaft 28. Synchronizer 162 is selectively actuatable to connect either gear 84 or gear 74 for common rotation with first countershaft 26.

A transmission of the present disclosure offers several advantages. These include improved performance, especially from the standpoints of efficiency, responsiveness and smoothness and improved packaging, primarily in reduced size and weight, is essentially constant.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:
1. A transmission comprising:
a transmission housing;
a dual clutch assembly having a clutch housing connectable to a flywheel of an engine, wherein the clutch housing is rotationally supported within the transmission housing;
a first, a second, a third, and a fourth gear set, wherein the first gear set includes a first gear, a second gear, a third gear, and a fourth gear, wherein the first gear is in mesh with the second gear and the second gear is in mesh with the third gear, and the third gear is in mesh with the fourth gear, the second gear set includes a first gear in mesh with a second gear and a third gear, the third gear set includes a first gear in mesh with a second gear and the second gear in mesh with a third gear, and the fourth gear set includes a first gear in mesh with a second gear and a third gear;
a first transmission input member rotatably supported in the transmission housing;
a second transmission input member rotatably supported in the transmission housing;
a first countershaft rotatably supported within the transmission housing and spaced apart from and parallel with the first and second transmission input members, wherein the fourth gear of the first gear set is selectively connectable for common rotation with the first countershaft, and the second gears of the second gear set, the third gear set, and the fourth gear set are each selectively connectable for common rotation with the first countershaft;
a second countershaft rotatably supported within the transmission housing and spaced apart from and parallel with the first and second transmission input members, wherein the second gear of the first gear set is selectively connectable for common rotation with the second countershaft, and the third gears of the second gear set, third gear set, and fourth gear set are each selectively connectable for common rotation with the second countershaft;
a first transfer gear rotatably and directly fixed for permanent, common rotation to the first countershaft;
a second transfer gear rotatably and directly fixed for permanent, common rotation to the second countershaft;
an output member in mesh with both the first transfer gear and the second transfer gear; and
at least four synchronizer assemblies for selectively coupling at least one of the gears of the first, second, third, and fourth gear sets with at least one of the first countershaft and the second countershaft,
wherein the selective engagement of the dual clutch assembly interconnects the dual clutch housing with at least one of the first and the second transmission input members and the selective engagement of at least one of the at least four synchronizer assemblies establishes one of seven forward speed ratios and one reverse speed ratio.

2. The transmission of claim 1 wherein each of the first gears of the first, and second gear sets are rotatably and directly fixed for permanent, common rotation with the first transmission input member and wherein the first gears of the third and fourth gear sets are rotatably and directly fixed for permanent, common rotation with the second transmission input member.

3. The transmission of claim 2 wherein a first of the at least four synchronizer assemblies is a double synchronizer assembly that selectively connects the fourth gear of the first gear set and the second gear of the second gear set to the first countershaft.

4. The transmission of claim 3 wherein a second of the at least four synchronizer assemblies is a double sided synchronizer assembly that selectively connects the second gear of the first gear set and the third gear of the second gear set to the second countershaft.

5. The transmission of claim 4 wherein a third of the at least four synchronizer assemblies is a double sided synchronizer assembly that selectively connects the third gear of the third gear set and the third gear of the fourth gear set to the second countershaft.

6. The transmission of claim 5 wherein a fourth of the at least four synchronizer assemblies is a double sided synchronizer assembly that selectively connects the second gear of the third gear set and the second gear of the fourth gear set to the first countershaft.

7. The transmission of claim 1 further comprising a fifth gear set and at least a fifth synchronizer assembly,
wherein the fifth gear set includes a first gear in mesh with a second gear and wherein the first gear is rotatably and directly fixed for permanent, common rotation with the second transmission input member, and wherein a first of the at least five synchronizer assemblies is a double sided synchronizer assembly that selectively connects the fourth gear of the first gear set and the second gear of the second gear set to the first countershaft, and a second of the at least five synchronizer assemblies is a double sided synchronizer assembly that selectively connects the second gear of the first gear set and the third gear of the second gear set to the second countershaft, and a third of the at least five synchronizer assemblies is a double sided synchronizer assembly that selectively connects the third gears of the third and fourth gear sets with the second countershaft, and a fourth of the at least five synchronizer assemblies is a double sided synchronizer assembly that selectively connects the second gears of the third and fourth gear sets to the first countershaft, and a fifth of the at least five synchronizer assemblies is a single sided synchronizer assembly that selectively connects the second gear of the fifth gear set to the second countershaft, and wherein the fifth gear set is adjacent the dual clutch assembly, the fourth gear set is adjacent the fifth gear set, the third gear set is adjacent the fourth gear set, the second gear set is adjacent the third gear set and the first gear set is adjacent the second gear set.

8. The transmission of claim 1 further comprising a fifth and a sixth gear set and at least six synchronizer assemblies, wherein the fifth gear set includes a first gear in mesh with a second gear and wherein the first gear is rotatably and directly fixed for permanent, common rotation with the second transmission input member, and the sixth gear set includes a first gear in mesh with a second gear and wherein the first gear is rotatably and directly fixed for permanent, common rotation with the first transmission input member, and wherein a first of the at least six synchronizer assemblies is a double sided synchronizer assembly that selectively connects the fourth gear of the first gear set and the second gear of the second gear set to the first countershaft, and a second of the at least six synchronizer assemblies is a double sided synchronizer assembly that connects the second gear of the first gear set and the third gear of the second gear set to the second countershaft, and a third of the at least six synchronizer assemblies is a double sided synchronizer assembly that connects the second gear of the sixth gear set and the third gear of the fourth gear set to the second countershaft, and a fourth of the at least six synchronizer assemblies is a double sided synchronizer assembly that connects the third gear of the fourth gear set and the second gear of the fifth gear set with the second countershaft, and wherein a fifth of the at least six synchronizer assemblies is a single sided synchronizer assembly that connects the second gear of the third gear set to the first countershaft and a sixth of the at least six synchronizer assemblies is a single sided synchronizer assembly that connects the second gear of the fourth gear set to the first countershaft, and wherein the fifth gear set is adjacent the dual clutch assembly, the fourth gear set is adjacent the fifth gear set, the third gear set is adjacent the fourth gear set, the sixth gear set is adjacent the third gear set, the second gear set is adjacent the sixth gear set and the first gear set is adjacent the second gear set.

9. The transmission of claim 1 wherein the second transmission input member is concentric with the first transmission input member and at least partially surrounds the first transmission input member.

10. The transmission of claim 1 wherein the first gear set provides a first forward speed ratio and a third forward speed ratio, the second gear set provides a fifth forward speed ratio and a seventh forward speed ratio, the third gear set provides a fourth forward speed ratio and a sixth forward speed ratio, the fourth gear set provides a second forward speed ratio and a reverse speed ratio.

11. The transmission of claim 10 wherein the fourth gear set is adjacent the dual clutch assembly, the third gear set is adjacent the fourth gear set, the second gear set is adjacent the third gear set, and the first gear set is adjacent the second gear set.

12. A transmission comprising:
   a transmission housing;
   a dual clutch assembly having a clutch housing connectable to a flywheel of an engine, wherein the clutch housing is rotationally supported within the transmission housing;
   a first, a second, a third, and a fourth gear set, wherein the first gear set includes a first gear, a second gear, a third gear, and a fourth gear, wherein the first gear is in mesh with the second gear and the second gear is in mesh with the third gear, and the third gear is in mesh with the fourth gear, the second gear set includes a first gear in mesh with a second gear and a third gear, the third gear set includes a first gear in mesh with a second gear and a third gear, and the fourth gear set includes a first gear in mesh with a second gear and the second gear in mesh with a third gear;
   a first transmission input member rotatably supported in the transmission housing; wherein the first gears of the first and second gear sets are rotatably and directly fixed for permanent, common rotation with the first transmission input member;
   a second transmission input member rotatably supported in the transmission housing, wherein the first gears of the third and fourth gear sets are rotatably and directly fixed for permanent, common rotation with the second transmission input member and wherein the second transmission input member is concentric with the first transmission input member and at least partially surrounds the first transmission input member;
   a first countershaft rotatably supported within the transmission housing and spaced apart from and parallel with the first and second transmission input members, wherein the fourth gear of the first gear set is selectively connectable for common rotation with the first countershaft, and the second gears of the second gear set, third gear set, and fourth gear set are each selectively connectable for common rotation with the first countershaft;
   a second countershaft rotatably supported within the transmission housing and spaced apart from and parallel with the first and second transmission input members, wherein the second gear of the first gear set is selectively connectable for common rotation with the second countershaft, and the third gears of the second gear set, third gear set, and fourth gear set are each selectively connectable for common rotation with the second countershaft;
   a first transfer gear rotatably and directly fixed for permanent, common rotation to the first countershaft;
   a second transfer gear rotatably and directly fixed for permanent, common rotation to the second countershaft;
   an output member in mesh with both the first transfer gear and the second transfer gear; and
   at least a first, a second, a third, and a fourth synchronizer assembly,
   wherein the first synchronizer assembly is a double sided synchronizer assembly that selectively connects the fourth gear of the first gear set and the second gear of the second gear set to the first countershaft, the second synchronizer assembly is a double sided synchronizer assembly that selectively connects the second gear of the first gear set and the third gear of the second gear set to the second countershaft, the third synchronizer assembly is a double sided synchronizer assembly that selectively connects the third gear of the third gear set and the third gear of the fourth gear set to the second countershaft, and the fourth synchronizer assembly is a double sided synchronizer assembly that selectively connects the second gear of the third gear set and the second gear of the fourth gear set to the first countershaft, and
   wherein the selective engagement of the dual clutch assembly interconnects the dual dutch housing with at least one of the first and the second transmission input members and the selective engagement of at least one of the four synchronizer assemblies establishes one of seven forward speed ratios and one reverse speed ratio.

13. The transmission of claim 12 wherein the second transmission input member is concentric with the first transmission input member and at least partially surrounds the first transmission input member.

14. The transmission of claim 12 wherein the first gear set provides a first forward speed ratio and a third forward speed ratio, the second gear set provides a fifth forward speed ratio and a seventh forward speed ratio, the third gear set provides a fourth forward speed ratio and an sixth forward speed ratio, the fourth gear set provides a second forward speed ratio and a reverse speed ratio.

15. The transmission of claim 12 wherein the fourth gear set is adjacent the dual dutch assembly, the third gear set is adjacent the fourth gear set, the second gear set is adjacent the third gear set, and the first gear set is adjacent the second gear set.

16. A transmission comprising:
   a transmission housing;
   a dual clutch assembly having a clutch housing connectable to a flywheel of an engine, wherein the clutch housing is rotationally supported within the transmission housing;
   a first, a second, a third, a fourth, and a fifth gear set, wherein the first gear set includes a first gear, a second gear, a third gear, and a fourth gear, wherein the first gear is in mesh with the second gear, the second gear is in mesh with the third gear, and the third gear is in mesh with the fourth gear, the second gear set includes a first gear in mesh with a second gear and a third gear, the third gear set includes a first gear in mesh with a second gear, the fourth gear set includes a first gear in mesh with a second gear, and the fifth gear set includes a first gear in mesh with a second gear and a third gear;
   a first transmission input member rotatably supported in the transmission housing and wherein the first gears of the first and second gear sets are rotatably and directly fixed for permanent, common rotation with the first transmission input member;
   a second transmission input member rotatably supported in the transmission housing, wherein the first gears of the third, fourth, and fifth gear sets are rotatably and directly fixed for permanent, common rotation with the second transmission input member;

a first countershaft rotatably supported within the transmission housing and spaced apart from and parallel with the first and second transmission input members, wherein the fourth gear of the first gear set is selectively connectable for common rotation with the first countershaft, and the second gears of the second, third, and fifth gear sets are each selectively connectable for common rotation with the first countershaft;

a second countershaft rotatably supported within the transmission housing and spaced apart from and parallel with the first and second transmission input members, wherein the second gears of the first and fourth gear sets, and second gear of the third gear set and the third gears of the second, and fifth gear sets are each selectively connectable for common rotation with the second countershaft;

a first transfer gear rotatably and directly fixed for permanent, common rotation to the first countershaft;

a second transfer gear rotatably and directly fixed for permanent, common rotation to the second countershaft;

an output member in mesh with both the first transfer gear and the second transfer gear;

at least four synchronizer assemblies for selectively coupling at least one of the gears of the first, second, third, fourth, and fifth gear sets with at least one of the first countershaft and the second countershaft, and wherein the selective engagement of the dual clutch assembly interconnects the dual dutch housing with at least one of the first and the second transmission input members and the selective engagement of at least one of the four synchronizer assemblies establishes one of seven forward speed ratios and one reverse speed ratio.

17. The transmission of claim 16 wherein a first of the at least four synchronizer assemblies is a double sided synchronizer assembly that selectively connects the fourth gear of the first gear set and the second gear of the second gear set to the first countershaft, a second of the at least four synchronizer assemblies is a double sided synchronizer assembly that selectively connects the second gear of the first gear set and the third gear of the second gear set to the second countershaft, a third of the at least four synchronizer assemblies is a double sided synchronizer assembly that selectively connects the second gear of the fourth gear set and the third gear of the fifth gear set to the second countershaft, and a fourth of the at least four synchronizer assemblies is a double sided synchronizer assembly that selectively connects the second gear of the third gear set and the second gear of the fifth gear set to the first countershaft.

18. The transmission of claim 16 wherein the second transmission input member is concentric with the first transmission input member and at least partially surrounds the first transmission input member.

19. The transmission of claim 16 wherein the first gear set provides a first forward speed ratio and a third forward speed ratio, the second gear set provides a fifth forward speed ratio and a seventh forward speed ratio, the third gear set provides a sixth forward speed ratio, the fourth gear set provides a fourth forward speed ratio, the fifth gear set provides a second forward speed ratio and a reverse speed ratio.

20. The transmission of claim 16 wherein the fifth gear set is adjacent the dual dutch assembly, the fourth gear set is adjacent the fifth gear set, the third gear set is adjacent the fourth gear set, the second gear set is adjacent third gear set, and the first gear set is adjacent the second gear set.

* * * * *